Figure 3:
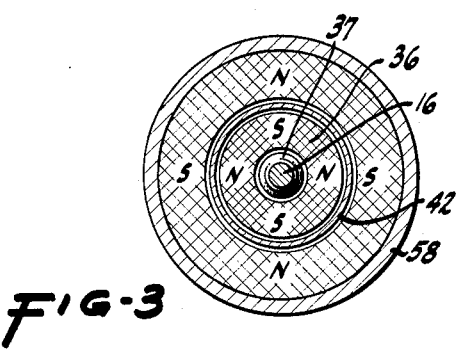

March 8, 1966     T. B. MARTIN     3,238,883
MAGNETIC DRIVE GEAR PUMP

Filed March 9, 1964     2 Sheets-Sheet 1

INVENTOR.
THOMAS B. MARTIN
BY Julian Caplan
ATTORNEY

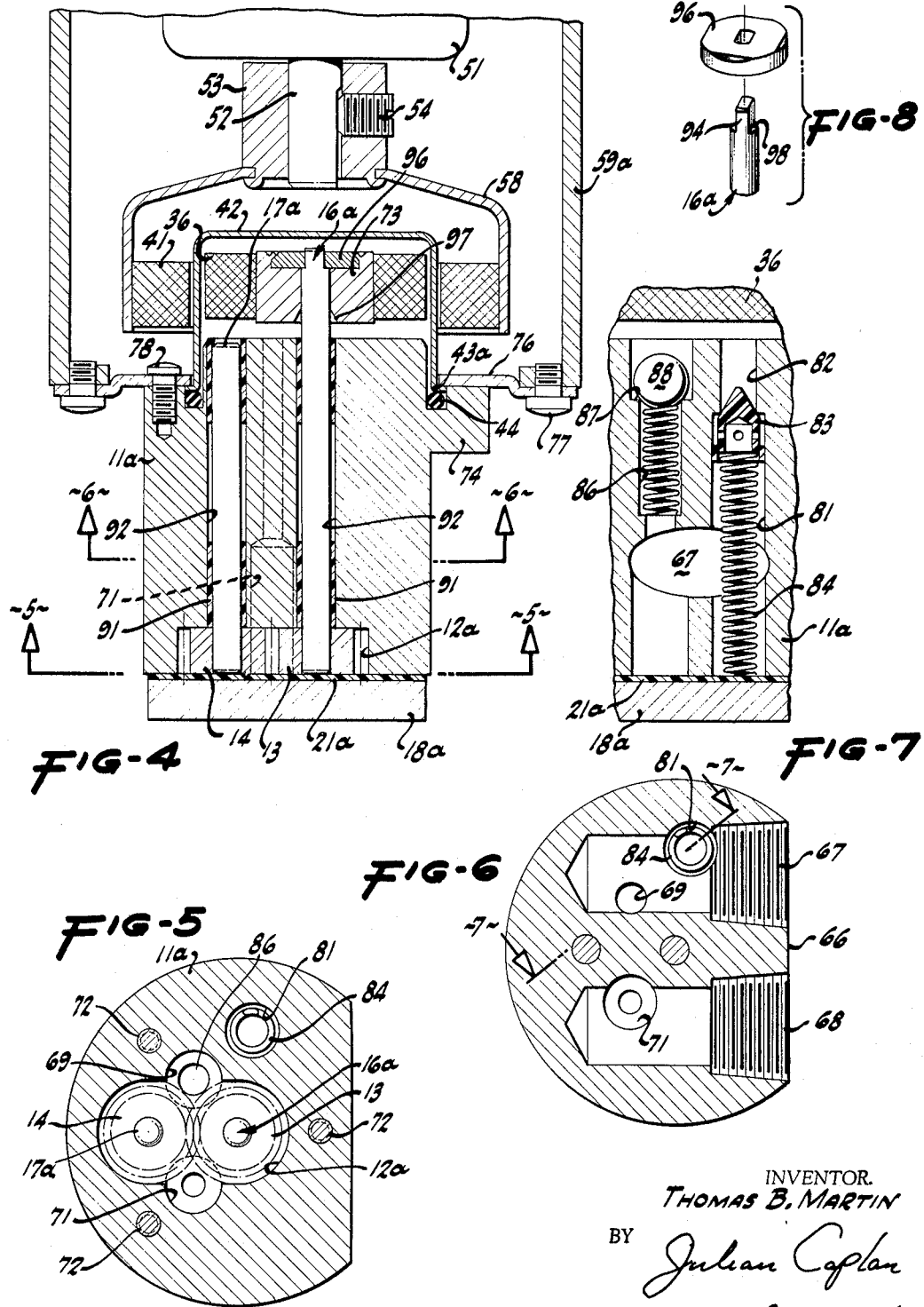

United States Patent Office 3,238,883
Patented Mar. 8, 1966

3,238,883
MAGNETIC DRIVE GEAR PUMP
Thomas B. Martin, % Micro-Pump Corp., P.O. Box 392,
Danville, Calif.
Filed Mar. 9, 1964, Ser. No. 350,503
14 Claims. (Cl. 103—118)

This invention relates to a new and improved magnetic drive gear pump and more particularly to a pump which is driven by a magnetic coupling through a completely sealed partition. A principal feature and advantage of the construction hereinafter described in detail is that there is no shaft seal to leak, wear or become sticky and impose undue load on the driving motor, or to generate destructive amounts of frictional heat in the event that the pump runs dry. This result is obtained by the use of concentric magnets, one driven by the motor and the other on the pump shaft. Although the gap between the magnets is small, nevertheless it is sufficient so that a partition of membrane may be interposed between the two magnets to serve as a seal and thus eliminate the conventional rotary pump seal interposed between the pump housing and the shaft which extends exteriorly of the pump housing and which frequently is the cause of leakage and other undesirable features.

A still further feature of the construction is the fact that the sealed pump assembly may be removed intact and replaced with another pump of the same or different design without interference with the driving motor. Thus sealed pumps may be substituted on the driving motor whenever required. Conversely the motor may be replaced without interfering with the pump and its associated piping.

A still further feature of the invention is the fact that the planes of magnetic symmetry of the two magnets mounted on the pump and motor respectively are offset from each other in an axial direction. Such offset produces an axial thrust on the pump shaft which is used as one means of sealing the pump gears against bypass leakage.

As hereinafter shown in detail, the pump which is the subject of this invention has a simplified construction and ease of manufacture and the materials of construction are such as to avoid the necessity for special lubrication. The result of these features is a low-cost metering pump which produces high reliability, long life, and absence from troublesome leaks and service problems.

In one form of the invention hereinafter described in detail a gear pump for delivery at a prescribed constant rate of flow at a relatively low total pressure rise is provided. Such a pump is useful in delivery of fuel to an atomizing type oil burner. Recent developments in oil burners accomplish atomization by means other than delivery of the fuel under high pressure by a pump. Thus the function of the pump in such installations is merely to deliver a metered quantity of fuel oil to the burner at a prescribed constant rate and the work done by the pump is merely to lift the fuel from a tank and overcome the small friction losses in the piping. Thus a very small gear pump which is magnetically coupled to a motor delivers at a flow rate of from 1.0 gallon per hour to 0.1 gallon per hour with an accuracy of plus or minus 5%. A pump of such characteristics is very suitable for the purposes described.

Another feature of the invention is the fact that a small shaded pole induction motor is used to drive the gear pump, such a motor having a low cost and high reliability. The motor does not require starting switches which are a source of danger in that they sometimes spark and create a fire hazard. Motors of this type have a low-starting torque and hence have heretofore been used for fans and blowers having substantially zero starting torque requirements and no seals or other rubbing components. On the other hand, pumps for liquid such as fuel oil tend to stick after long periods of idleness or to leak or become overheated due to friction. Where the seals tend to stick, an overload of the motor is frequently the result and this can be extremely dangerous in installations of the type described. The power requirements of the pumps hereinafter described in detail are so small that the drive magnet may slip relative to the driven magnet at less than the limited starting torque of the motor, thus enhancing its safety against being stalled and overheated. Additionally, ceramic magnets have relatively unlimited life and are unaffected in any way by slipping or other conditions of operation.

In another form of the invention hereinafter described in detail, a self-contained pressure relief valve is incorporated in the pump discharge flow whereby the discharge is bypassed back to the pump inlet when the pressure exceeds a predetermined amount. Such construction simulates the characteristics of a centrifugal pump to operate and produce pressure under no flow conditions.

Still another feature of one form of the invention hereinafter described is the position of a bypass valve between the inlet and discharge ports of the pump which is normally open when the pump is at rest and is forced shut in the manner of a check valve when the pump is operating and producing pressure. Such construction simulates another characteristic of a centrifugal pump, namely that it allows the flow to drain through the pump in either the inlet or outlet direction for purpose of draining the line when the pump is not in service. Ordinary gear pumps do not have this feature.

Another feature of the pump is that it has the advantage of a positive displacement gear pump, such as self-priming and bubble pumping capabilities but at the same time has the desirable features of a centrifugal pump.

A still further feature of the invention is the simplified construction which provides for precise control of end clearance for the gear and impellers by means of a resilient gasket in combination with the axial thrust resulting from the offset of the magnets which drive the pump.

A still further feature of the invention is the incorporation of features facilitating installation and removal of gears and gear shafts without disturbing other portions of the pump or motor.

Other objects of the present invention will become apparent upon reading the following specification and referring to the accompanying drawings in which similar characters of reference represent corresponding parts in each of the several views.

Figure 2:
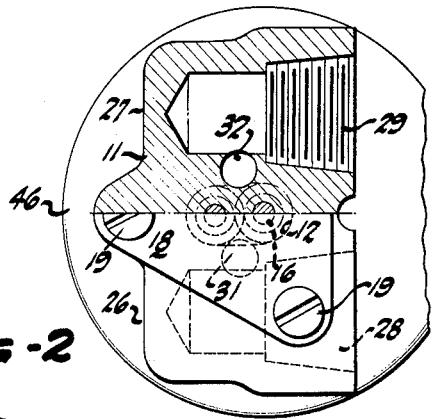
Figure 1:
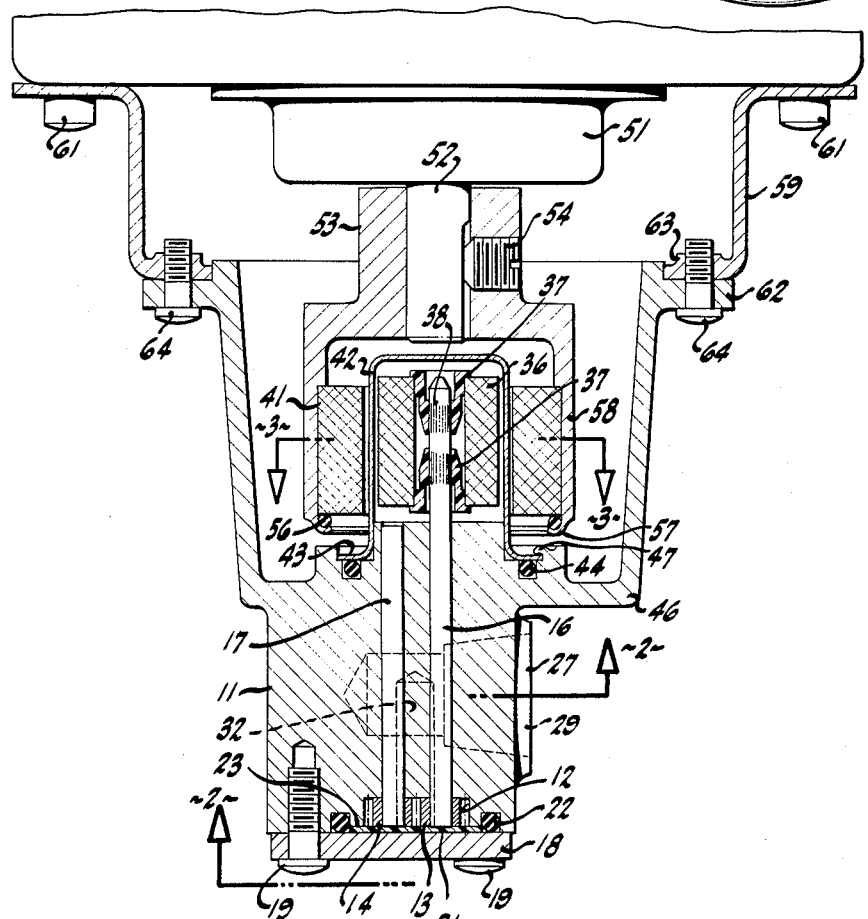

In the drawings:
FIG. 1 is a vertical midsectional view of one form of pump in accordance with this invention.
FIGS. 2 and 3 are sectional views substantially along lines 2—2 and 3—3 respectively of FIG. 1.
FIG. 4 is a view similar to FIG. 1 of a modified construction.
FIGS. 5 and 6 are sectional views substantially along lines 5—5 and 6—6 respectively of FIG. 4.
FIG. 7 is a fragmentary sectional view substantially along line 7—7 of FIG. 6.
FIG. 8 is a detail view of the shaft of FIG. 4.

Turning first to the form of the invention shown in FIG. 1 the pump housing 11, which may be die cast, has a pump chamber 12 at one end in which are mounted drive and driven gears 13, 14 on their respective shafts 16, 17 which are, in the form of the invention shown, longitudinally located. Gears 13, 14 may be made from strong pinion wire, commercially available in the form of long rods having precisely-formed gear teeth on the periphery, cut to length and center holes bored precisely to receive shafts 16 and 17 in press fit relation. Closing off the end of the pump is triangular cover plate 18 held by screws 19 with a disk gasket 21 interposed between cover plate 18 and housing 11 in the vicinity of gears 13, 14 and with an O-ring gasket 22 recessed into a groove in the end of housing 11 around the perimeter of disk gasket 21. Disk gasket 21 is received in a recess 23 in the end of housing 11 of lesser depth than the thickness of gasket 21. Gasket 21 is preferably formed of a resilient material such as Teflon or a reinforced plastic material containing a lubricant produced by Crane Packing Co. under the trade name Chemloy, a composition of Teflon, glassfiber and molybdenum disulphide. Such gasket 21 is very resilient and has good wearing characteristics. The viscosity of many materials pumped varies with temperature; fuel oil is a good example of this property. Disk gasket 21 has a coefficient of thermal expansion five to seven times that of housing 11 and cap 18. Hence gasket 21 thickens with temperature increases and closes minute clearances. Temperature changes do not change the back-leakage characteristics. Thus when the cover plate 18 is tightened against the housing the resilient disk 21 is squeezed against the flat surface of recess 23 in which it is located whereby it becomes compressed and thinner. The remainder of the disk is not so compressed and can be moved inward against the gears 13, 14 to limit the end clearance of the gears and cavity 12. A compressible material such as cork is also useful for disk 21 and other materials of like characteristics may be used. O-ring 22 seals against leakage beyond gasket 21.

On either side of housing 11, about midway of its length are bosses 26, 27 which are formed with vertical inlet and outlet ports 28, 29. Longitudinal holes 31, 32 intersect inlet and outlet ports 28, 29 and communicate with opposite sides of cavity 12 in a construction well-known in the gear-pump art.

Shafts 16, 17 extend from end to end of housing 11 and drive shaft 16 of gear 13 projects beyond the end of housing 12. Concentric with shaft 16 is an annular ceramic magnet 36 preferably having two north poles and two south poles. A pair of plastic magnet mounting members 37 holds magnet 36 central with shaft 16 and accommodates dimensional variations of the inside diameter of magnet 36. Members 37 may be made of a material such as nylon which has good gripping capability to grip shaft 16 and magnet 36 and yet will deform under stress. Thus members 37 are highly dimensionally compliant. Shaft 16 may be formed with score marks 38 to supplement gripping of supports. It will be noted from FIG. 1 that there is no direct bearing of the magnet mounting members 37 in the same plane between their inner contact with shaft 16 and their outer contact with magnet 36. This construction eliminates imposition of undue bursting strain on magnet 36 due to volume changes in the support as the result of changes in condition, such as water absorption or temperature. Such relief from undue bursting strain is of considerable importance in that magnet 36 is made of a fragile ceramic material. The cylindrical section of member 37 between the zones of contact with shaft 16 and magnet 36 respectively may deflect and absorb the strain without direct bearing on either the shaft or the magnet.

Magnet 36 as well as drive magnet 41 is a barium carbonate material having incorporated therein a considerable mass of magnetic material such as iron oxide. Such a magnet is produced by Stackpole Carbon Co. under the trademark Cera Magnet. It is a characteristic of such magnet that a plurality of poles may be substantially permanently magnetically induced therein. The magnet has extreme resistance to demagnetization and high electrical resistivity. Eddy current losses are negligible. The number of poles per magnet 36, 41 is subject to wide variation but in the form here shown (FIG. 3) there are two north and two south poles in each of the magnets. The magnets 36, 41 are concentric about the axis of rotation of shaft 16 and approximately the same axial length, but it will be noted that the magnets are axially offset relative to each other. In the form of the invention here shown the inner magnet 36 is displaced upward in FIG. 1. However, as used in the accompanying claims, the term "plane of magnetic symmetry" means a plane perpendicular to the axis of rotation of the magnet which is midway of such axis in a magnetic sense. In a preferred form of the invention, the plane of magnetic symmetry of magnet 36 is above that of magnet 41 in an axial sense. This produces an end thrust downward on shaft 16 which tends to force gears 13, 14 against gasket 21 and to improve the bypass seal characteristics. Since gasket 21 is more resistant than housing 11, the end thrust also improves wear characteristics.

A cup-shaped partition or membrane 42 surrounds inner magnet 36 and extends into the annular space between the two magnets. Partition 42 performs the function of a non-rotative seal for shaft 16, and hence avoids the friction and leakage which conventionally are encountered when a rotary shaft seal is used. An outward directed flange 43 is formed on the inner end of partition 42 and bears again an O-ring 44 recess into the inner end of bell 46 of pump housing 11. The outer peripheral edge of flange 43 is staked or otherwise held in position. (See reference numeral 47.) Partition 42 is preferably non-magnetic, and particularly if speed is high, a poor electrical conductor.

The driving motor 51 is a shaded pole induction motor having its shaft 52 aligned with pump shaft 16. A bell-shape hub 53 is affixed on the shaft 52 by setscrew 54. The outer magnet sleeve 41 is secured by ring 56 and crimp 57 to the end of hub bell 58. Bell 58 is preferably non-magnetic, but for slow speeds this is not critical. An adapter housing 59 is secured to the outer end of motor 51 by means of extended length stackbolts 61. Adapter 59 is preferably an inexpensive sheet metal member and different shapes of adapters may be provided to be substituted in different shapes and sizes of standard motors 51 thus making the pump interchangeable for such motors. The outer flange 62 of the bell 46 of pump housing 11 and the inward directed flange 13 of adapter 59 intersect and are held by screws 64 to align the two members concentric with the common axis of rotation of the motor shaft 52 and pump shaft 16.

In operation, fluid enters through port 28 which communicates with inlet port of the pump by means of hole 31. The pump is caused to rotate with motor 51 by reason of the magnetic drive between the two concentric magnets 41, 36. Such pump is reversible and the flow reverses when the motor rotation reverses. Where there is a sticking in the gears 13, 14 or a jamming in the outlet line, the two magnets 36, 41 may slip relative to each other. By reason of the axial offset of the planes of symmetry of the magnets, an end thrust downward as viewed in FIG. 1 is created which forces gears 13, 14 against gasket 21.

In the form of the invention shown in FIG. 4 the motor and magnetic drive are substantially the same as in the preceding modification and substantially identical parts are provided with the same reference numerals and their detailed descritpion accordingly eliminated herein.

Pump housing 11a has a flat top surface 66 at one end into opposite sides of which are recessed inlet and outlet ports 67, 68 which communicate through longitudinal passageways 69, 71 with pump cavity 12a. Within pump cavity 12a are gears 13, 14 which mesh with each other and are mounted on shafts 16a, 17a respectively. Cover plate 21a closes off the end of housing 11a with gasket 21a interposed. Gasket 21a may be of the same material gasket 21 in the preceding modification. Plate 21a is held against housing 11a by screws 72.

Shaft 16a carries driven magnet 36 on its end opposite gear 13, the magnet being shown positioned on shaft 16a in this instance by spacer 73. Bell 59a on motor 51 is connected with flange 74 of pump housing 11a by means of disk 76 secured to bell 59a by screws 77. The inner periphery of disk 76 is held by screws 78 against the peripheral flange 43a on the end of partition 42 and holds cup 42 against O-ring 44 recessed into pump housing 11a.

A feature of the construction of FIG. 4 is the provision of the drill passage 81 in pump body 11a which connects with inlet port 67. Reduced diameter portion 82 of passage 81 forms a seat for valve plunger 83 which is pressed against such seat by spring 84 in passage 81. Hole 71 extends through casing 11a and communicates with the interior of cup 42 and hence the pressure within cup 42 is the discharge pressure of the pump. When the discharge pressure in the space within cup 42 is high enough to move plunger 83 against the force of spring 84, then the pump discharge flow is allowed to by-pass internally back to inlet port 67.

As a further feature of this construction, passage 86 is drilled in pump body 11a and provided with seat 87 for a check ball 88 which prevents back flow from the interior of the cup 42 into inlet port 67. Since normally during operation the discharge pressure inside cup 42 is in excess of inlet pressure, ball 88 seats on seat 87. When there is no discharge pressure, spring 86 pushes slightly against ball 88 so that the ball will be lifted from its seat. In this condition, flow can take place in either direction through the pump so long as the pressure drop of the flow moving past ball 88 in the direction towards spring 86 does not exceed the effect of spring 86. Thus the pump and any pipes connected thereto can be drained under the force of gravity. In the event that pump is drained via discharge boss 68, then bias spring 86 is not necessary because the drainage flow will be in proper direction to lift ball 88 from seat 87. However, if the pump should be drained via inlet port 67, then spring 86 is required unless the pump is mounted in such position that gravity acting on the mass of ball 88 will cause it to remain open against the adverse flow which then takes place in the draining process. The clearance of ball 88 in recess 87 must be such that as soon as the pump is started the internal leakage flow past the ball inside cup 42 to the inlet will cause sufficient pressure drop to snap ball 88 shut against its seat 87 at as low a pressure as possible. This determines the low pressure limit against which the pump is capable of operating. When spring 86 is not required the flow of pressure limit is substantially zero.

As a feature of the invention, if gears 13, 14 are made from Teflon and the resilient gasket 21a from a commercially available material composed of Teflon, glassfiber and molybdenum disulfide, the pump will have extremely long life and will be capable of running dry for considerable periods of time without damage. As a further feature, the opposite ends of shafts 16a, 17a may be journalled in bushings 91 in holes 92 in body 11a. Bushings 91 may be of the same material as gaskets 21 and 21a. With the use of resilient gasket 21a and bushings 92, the lubricity of the fluid being pumped need not be considered as a factor affecting pump operations. It will be understood, of course, that other material of construction may be used to satisfy the foregoing condition.

A feature of the invention is the fact that the end cap 21a may be removed exposing the impeller gears 13, 14 in their cavity 12a so that the pump may be cleaned and inspected. The impellers 13, 14 and shafts 16a, 17a can be removed entirely. The end 94 of shaft 16a is formed with flats or other non-circular shape. A complementary hole is formed in disc 96 which is recessed into the remote end of spacer 73 and held non-rotatively with respect to spacer 73. To facilitate insertion of shaft 16a, a countersink 97 is formed in the near end of spacer 73.

Thus shaft 16a is conveniently inserted into and keyed relative to magnet 36. Shoulder 98 on shaft 16a spaces magnet 36 in the required position along the axis of shaft 16a, so that the proper offset of planes of magnetic symmetry of magnets 36 and 41 is automatically achieved. Shaft 16a is likewise conveniently withdrawn, magnet 36 remaining within partition 42 pending reassembly.

The pump is fully repairable and the impellers replaceable without disturbing any of the hydraulic or electrical connections to the pump installation itself. As has been mentioned, the pump is replaceable as a sealed entity on motor 51.

When partition 42 is electrically non-conductive the pump is electrically insulated from motor 51. Further, if partition 44 has low thermal conductivity, pump and motor are thermally insulated, which is of importance in circulating a low temperature refrigerant without undue heat loss.

What is claimed is:

1. A pump comprising a casing formed at one end with a pump cavity, a pair of shafts in said casing, pump gears in said cavity mounted on said shafts, said casing formed with inlet and outlet ports communicating with said cavity on opposite sides of said gears, a cap on said one end of said casing closing off said cavity, drive means for rotating one of said shafts biasing said shaft toward said cap whereby said gears are biased toward said cap, and a resilient gasket interposed between said cap and said gears, said gasket formed of a reinforced plastic material containing molybdenum disulphide.

2. A pump comprising a casing formed at one end with a pump cavity, a pair of shafts in said casing, pump gears in said cavity mounted on said shafts, said casing formed with inlet and outlet ports communicating with said cavity on opposite sides of said gears, a cap on said one end of said casing closing off said cavity and drive means for rotating one of said shafts biasing said shaft toward said cap whereby said gears are biased toward said cap, said drive means comprising a first annular magnet on said one shaft, a second annular magnet surrounding and in proximity to said first magnet, and means for rotating said second magnet, each said magnet having a plane of magnetic symmetry, said planes offset in an axial direction.

3. A pump according to claim 2 in which the inside diameter of said first magnet is substantially greater than said one shaft, and which further comprises at least one support extending along said one shaft between said one shaft and said first magnet, said support a tone end gripping said one shaft and at the opposite end gripping said first magnet.

4. A pump according to claim 2 in which said first magnet is located externally of said casing at a second end of said casing opposite said pump cavity and which further comprises a thin, non-magnetic cup-shaped partition surrounding said first magnet and inside said second magnet and sealed to said second end of said casing whereby said shaft is sealed relative to said second end of said casing with a non-rotative seal.

5. A pump according to claim 4 in which said casing is formed with a first passage extending from said discharge port to said second end of said casing inside said partition and a second passage from said inlet port to said second end of said casing inside said partition and a bypass valve having a spring biasing said valve closed controlling flow through at least one said passage whereby when pressure in said discharge port exceeds a predetermined amount, flow from said discharge port bypasses through said first passage into said partition and around said first magnet and back through said second passage to said inlet port.

6. A pump according to claim 4 in which said casing is formed with a first passage extending from said discharge port to said second end of said casing inside said partition and a second passage from said inlet port to said second end of said casing inside said partition, a ball valve in said second passage, a weak spring biasing said ball valve open to drain said pump through both said inlet and discharge ports when said pump is inoperative, said ball valve closing where said pump is operating to close off communication through said second passage.

7. A pump according to claim 4 in which said casing is formed with a first passage extending from said discharge port to said second end of said casing inside said partition and a second passage from said inlet port to said second end of said casing inside said partition and bypass valve having a spring biasing said valve closed controlling flow through at least one said passage whereby when pressure in said discharge port exceeds a predetermined amount, flow from said discharge port bypasses through said first passage into said partition and around said first magnet and back through said second passage to said inlet port, a ball valve in said second passage, a weak spring biasing said ball valve open to drain said pump through both said inlet and discharge ports when said pump is inoperative, said ball valve closing where said pump is operating to close off communication through said second passage.

8. A pump according to claim 4 in which said means for rotating said second magnet comprises an electric motor aligned with said one shaft, an adapter fixed to said motor and surrounding both said magnets, an inward directed flange fixed at its outer periphery to said adapter and at its inner periphery engaging said casing, the inner periphery of said flanges retaining said cup relative to said casing.

9. A pump according to claim 4, in which said first magnet is formed with a support and said support and said shaft of said first magnet are formed with cooperating means to key said first magnet for rotation with its shaft, said shaft being axially movable relative to said support to withdraw said shaft with said first magnet remaining inside said partition.

10. A pump according to claim 9, in which said shaft and said support are cooperatively shaped to facilitate proper insertion of said shaft in said support and keying of said shaft to said support.

11. A pump according to claim 9, in which said shaft and said support are shaped to located said first magnet along said shaft, whereby in assembled position the plane of magnetic symmetry of said first magnet is offset in an axial direction relative to the plane of magnetic symmetry of said second magnet.

12. A pump comprising a casing, a shaft rotatable in said casing, pump means on said shaft, an end thrust bearing at one end of said shaft, said shaft extending out of said casing at a second end of said shaft opposite said first-mentioned end, a first annular magnet fixed for rotation with said shaft externally of said casing, a second annular magnet surrounding and in proximity to said first magnet, and means for rotating said second magnet, each said magnet having a plane of magnetic symmetry, said planes offset in an axial direction, and a thin, non-magnetic cup-shaped partition surrounding said first magnet and inside said second magnet and sealed to said second end of said casing whereby said shaft is sealed relative to said second end of said casing with a non-rotative seal.

13. A pump comprising a casing formed at a first end with a first pump cavity, a pair of shafts in said casing, pump gears in said first cavity mounted on said shafts, said casing formed with inlet and outlet ports communicating with said first cavity on opposite sides of said gears, a cap on said first cap of said casing closing off said first cavity and drive means for rotating one of said shafts biasing said shaft toward said cap whereby said gears are biased toward said cap and in which said casing is formed at an opposite second end with a second pump cavity, a first passage in said casing extending from said outlet port to said second end of said casing inside said second cavity and a second passage from said inlet port to said second end of said casing inside said second cavity and a by-pass valve having a spring biasing said valve closed controlling flow through at least one said passage when pressure in said outlet port exceeds a predetermined amount, flow from said outlet port bypasses through said first passage into said second cavity and back through said second passage to said inlet port.

14. A pump comprising a casing formed at a first end with a first pump cavity, a pair of shafts in said casing, pump gears in said first cavity mounted on said shafts, said casing formed with inlet and outlet ports communicating with said first cavity on opposite sides of said gears, a cap on said first end of said casing closing off said first cavity and drive means for rotating one of said shafts biasing said shaft toward said cap whereby said gears are biased toward said cap and in which said casing is formed at an opposite second end with a second pump cavity, a first passage in said casing extending from said outlet port to said second end of said casing inside said second cavity and a second passage from said inlet port to said second end of said casing inside said second cavity, a ball valve in said second passage, a weak spring biasing said ball valve open to drain said pump through both said inlet and outlet ports when said pump is inoperative, said ball valve closing when said pump is operating to close off communication through said second passage.

References Cited by the Examiner

UNITED STATES PATENTS

| | | | |
|---|---|---|---|
| 2,263,515 | 11/1941 | Pezzillo | 103—87 |
| 2,276,107 | 3/1942 | Simons | 103—126 |
| 2,970,548 | 2/1961 | Berner | 103—87 |

ROBERT M. WALKER, *Primary Examiner.*